Patented Mar. 23, 1943

2,314,440

UNITED STATES PATENT OFFICE 2,314,440

AZO DYESTUFFS AND PROCESS FOR COLORING THEREWITH

Bernd v. Bock and Hanns Ufer, Ludwigshafen-on-the-Rhine, and Helmut Kleiner, Cologne-Mulheim, Germany, assignors to General Aniline & Film Corporation, a corporation of Delware No Drawing. Application January 19, 1938, Serial No. 185,654. In Germany February 18, 1937

12 Claims. (Cl. 8—50)

The present invention relates to new azo dyestuffs and a process for coloring therewith.

We have found that new valuable azo dyestuffs especially suitable for dyeing cellulose esters and ethers are obtained by coupling diazotized aromatic amines free from sulphonic acid groups with N-arylamino carboxylic acids capable of coupling and having the general formula:

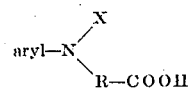

in which X is hydrogen or an alkyl, cycloalkyl, aralkyl or aryl radicle or in which X is a chain of several methylene groups connected with the aryl nucleus and R is an alkylene radicle containing at least two carbon atoms, or by saponifying the nitrile groups to carboxylic groups in azo dyestuffs free from sulphonic acid groups, corresponding to the general formula:

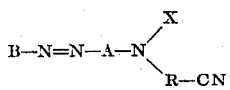

in which X and R have the significance given above and A and B are aromatic radicles.

Suitable N-arylamino carboxylic acids of the said kind may be obtained for example by the adding on of acrylic or methacrylic acid to aromatic primary or secondary amines or to heterocyclic nitrogen compounds, hydrogenated in the ring containing nitrogen. This adding on process may be carried out by heating an amine with an aqueous solution of acrylic or methacrylic acid to temperatures between 80° and 100° C. in the presence of small amounts of a mineral acid, and working up the reaction mixture by distillation. Suitable starting materials may also be obtained by the action of acrylic or methacrylic acid nitriles on amines of the said kind, and saponifying the ω-nitrilo-compounds formed by the action of dilute mineral acid. For example there may be mentioned as coupling components beta-N-arylaminopropionic acids, beta-N-arylamino-alpha-methylpropionic acid, beta-N-arylamino-beta-methylpropionic acids, such as beta-N-phenylaminopropionic acid, beta-N-(3-methylphenyl)-aminopropionic acid, beta-N-(2-methoxy-5-methylphenyl)-aminopropionic acid, beta-N-(2.5-dimethoxyphenyl)-aminopropionic acid, beta-N-(3-chlorphenyl)-aminopropionic acid, beta-N-(2-methyl-5-hydroxyphenyl)-aminopropionic acid or beta-1- or -2-naphthylaminopropionic acid. Suitable tertiary arylamino carboxylic acids are for example beta-N-alkyl-, -hydroxyalkyl-, -alkoxalkyl-, -acetoxalkyl-, -halogenalkyl-, -cyanalkyl- or -cycloalkyl-N-arylaminopropionic acids, such as beta-N-methyl-N-phenylaminopropionic acid, beta-N-hydroxyethyl-N-phenylaminopropionic acid, beta-N-ethoxyethyl-N-phenylaminopropionic acid, beta-N-hydroxyethoxyethyl-N-phenylaminopropionic acid, beta-N-ethyl-N-(3-methylphenyl)-aminopropionic acid, beta-N-hydroxyethyl-N-(3-methylphenyl)-aminopropionic acid, beta-N-cyanethyl-N-(3-methylphenyl)-aminopropionic acid, beta-N-normal-butyl-N-(2-methoxy-5-methylphenyl)-aminopropionic acid and the addition compounds of several molecules of ethylene oxide to secondary N-arylamino carboxylic acids of the said kind, and also N-aralkyl-N-arylaminopropionic acids, such as beta-N-benzyl-N-phenylaminopropionic acid or N-diarylaminopropionic acids, such as beta-N-diphenylaminopropionic acid. Suitable azo components are also such N-aryl-N-alkylaminopropionic acids in which the alkyl radicle consists of a chain of several methylene groups connected with the aryl nucleus, as for example N-beta-carboxyethyl-1.2.3.4-tetrahydroquinoline, N-beta-carboxyethyl-3-hydroxy-7-methyl-1.2.3.4-tetrahydroquinoline or N-beta-carboxyethyl-3.7-dihydroxy-1.2.3.4-tetrahydronaphthoquinoline.

As diazo components there are used the aromatic amines usual for the preparation of azo dyestuffs suitable for dyeing and printing acetate artificial silk, especially those being free from sulphonic acid groups, as for example aminobenzene, 2-chlor-1-aminobenzene, 4-aminobenzene-1-carboxylic acid, 4-aminobenzene-1-carboxylic acid methyl ester, 4-amino-1-acetaminobenzene, 4-aminophenyl-1-methylsulphone, 2-aminobenzothiazole and 1-aminonaphthalene. The diazo compounds of nitroarylamines are especially suitable, as for example 4-nitro-1-aminobenzene, 2-chlor-4-nitro-1-aminobenzene, 2.6-dichlor-4-nitro-1-aminobenzene, 6-chlor- or -brom-2.4-dinitro-1-aminobenzene, 6-cyano-2.4-dinitro-1-aminobenzene and 2-hydroxy-4-nitro-1-aminobenzene. There may also be used as diazo components aromatic amines already containing an azo group, as for example 4-aminobenzene, whereby valuable disazo dyestuffs are obtained.

Suitable initial dyestuffs containing nitrile groups can be obtained by coupling a diazo compound of the above described kind with a N-arylamino carboxylic nitrile of the formula

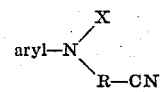

in which X is hydrogen or an alkyl, cycloalkyl, aralkyl or aryl radicle or a chain of several methylene groups connected with the aryl nucleus, and R is an alkylene radicle containing at least two carbon atoms. Dyestuffs of this kind may be obtained for example according to the process described in the application Ser. No.

12,328, filed March 21, 1935 by Karl Holzach et al., now U. S. Patent 2,109,024, issued February 22, 1938. The saponification of the nitrile group is preferably effected by heating the dyestuffs for several hours with acids, as for example hydrochloric acid, or in alkaline media, as for example in alcoholic caustic soda solution.

The new azo dyestuffs are generally speaking soluble in water in the form of their alkali salts and are especially suitable for dyeing and printing cellulose esters and ethers for which they have an excellent affinity. The dyeing of these organic cellulose derivatives with the alkali salts is carried out according to the methods usually employed in the application of watersoluble dyestuffs. The free acids may be likewise employed for dyeing textile materials prepared from cellulose esters and ethers, especially cellulose acetate silk, when adding thereto the usual dispersing agents. Clear dyeings having excellent fastness to light are thereby obtained which do not change in the wash.

The following examples will further illustrate the nature of this invention but the invention is not restricted to these examples. The parts are by weight.

Example 1

A diazonium salt solution prepared in the usual manner from 138 parts of 4-nitro-1-aminobenzene is added to a solution of 220 parts of beta-N-hydroxyethyl-N-phenylaminopropionic acid (obtainable by heating 1370 parts of N-hydroxyethylaminobenzene with 535 parts of 66 per cent aqueous acrylic acid solution at 90 to 100° C. for two hours) in 110 parts of 36 per cent hydrochloric acid and 2000 parts of water. The deposited dyestuff is dissolved in dilute caustic soda solution, salted out with sodium chloride, pressed off and dried at from 50° to 60° C. It dyes acetate artificial silk from an aqueous bath after the addition of sodium sulphate and acetic acid powerful red shades fast to light which do not change in the wash.

If there be used under otherwise identical conditions a solution of 245 parts of beta-N-cyanethyl-N-(3-methylphenyl)-aminopropionic acid (obtainable by heating about equimolecular proportions of N-ω-cyanethyl-3-methyl-1-aminobenzene and aqueous acrylic acid solution) in 120 parts of 32 per cent hydrochloric acid and 2000 parts of water, there is obtained a watersoluble azo dyestuff which dyes acetate artificial silk scarlet red shades excellently fast to light. By using beta-N-phenylamino-alpha-methylpropionic acid as coupling component, a dyestuff is obtained which dyes acetate artificial silk from an aqueous bath after the addition of sodium sulphate and acetic acid powerful scarlet red shades.

Example 2

A diazonium salt solution from 172.5 parts of 2-chlor-4-nitro-1-aminobenzene is added while stirring to a solution of 225 parts of beta-N-1-naphthylaminopropionic acid (obtainable by boiling a solution of 143 parts of 1-amino-naphthalene in 200 parts of alcohol with 63 parts of 56 per cent aqueous acrylic acid solution for 2 to 3 hours) in 120 parts of 32 per cent hydrochloric acid and 6000 parts of water. The coupling is completed after a short time. Dilute caustic soda solution is added until the solution has an alkaline reaction, the sodium salt of the dyestuff is salted out, pressed off and dried. It dyes acetate artificial silk beautiful, clear violet shades.

Example 3

A diazonium salt solution prepared from 209 parts of 2.6-dichlor-4-nitro-1-aminobenzene is added to a solution of 235 parts of beta-N-hydroxyethyl-N-(3-methylphenyl)-amino-propionic acid (see Example 1) in 110 parts of 36 per cent hydrochloric acid and 2000 parts of water. The resulting dyestuff is pressed off as dry as possible. It is then thoroughly admixed with the same amount of a dispersing agent, for example of dibutylnaphthalene sulphonic acid sodium salt or of dried sulfite-cellulose waste liquor by kneading, and then dried. The mixture thus obtained dyes cellulose acetate silk from an aqueous bath under the addition of sodium sulphate reddish brown shades.

Example 4

A diazonium salt solution from 262 parts of 6-brom-2.4-dinitro-1-aminobenzene in concentrated sulphuric acid is added, while adding 5000 parts of ice, to a solution of 200 parts of beta-N-methyl-N-(3-methylphenyl)-aminopropionic acid (obtainable by heating 106 parts of N-methyl-aminobenzene with 54 parts of 66 per cent aqueous acrylic acid solution at 80° C. for two hours) in 110 parts of 36 per cent hydrochloric acid and 1500 parts of water. The coupling is ended after a short time. The resulting dyestuff is pressed off, dissolved in dilute caustic soda solution, the sodium salt salted out with sodium chloride, pressed off and dried. It dyes acetate artificial silk powerful violet shades.

Example 5

A diazonium salt solution prepared from 151 parts of 4-aminobenzene-1-carboxylic acid methyl ester is added to a solution of 175 parts of beta-N-phenylaminopropionic acid (prepared by boiling under reflux 93 parts of aminobenzene and 65 parts of 56 per cent aqueous acrylic acid solution for about one hour, and removing the unchanged aminobenzene) in 120 parts of 32 per cent hydrochloric acid and 1500 parts of water. When coupling is completed, the coupling being accelerated by the addition of sodium acetate until the mineral acid reaction disappears, the solution is rendered slightly alkaline with dilute caustic soda solution. The sodium salt of the dyestuff formed is precipitated with sodium chloride, pressed off and dried. It dyes acetate artificial silk red-yellow shades.

Example 6

A diazonium solution prepared from 203.5 parts of 3-chlor-4-aminophenyl-1-methylsulphone is added to a solution of 188 parts of beta-N-(3-methylphenyl)-aminopropionic acid (see Example 1) in 110 parts of 36 per cent hydrochloric acid and 1500 parts of water. The coupling is completed very rapidly. The deposited dyestuff is pressed off, washed with water and the still moist dyestuff paste is dissolved in dilute caustic soda solution. The resulting sodium salt of the dyestuff is salted out with sodium chloride, pressed off and dried. It dyes acetate artificial silk powerful orange shades.

Example 7

A diazonium solution prepared from 180 parts of 6-methoxy-2-aminobenzothiazole is added to a solution of 200 parts of beta-N-methyl-N-(3-methylphenyl)-aminopropionic acid (see Example 1) in 120 parts of 32 per cent hydrochloric acid and 2000 parts of water. The coupling is completed very rapidly. The resulting dyestuff is dissolved in dilute caustic soda solution, the sodium salt of the dyestuff separated by adding sodium chloride, pressed off and dried. It dyes acetate artificial silk very clear rose-red shades from an aqueous bath with the addition of ammonium chloride.

Example 8

A diazonium solution prepared from 197 parts of 4-aminoazobenzene is added to a solution of 235 parts of beta-N-hydroxyethyl-N-(3-methylphenyl)-aminopropionic acid (obtainable by condensing N-hydroxyethyl-3-methyl-1-aminobenzene with acrylic acid) in 110 parts of 36 per cent hydrochloric acid and 2000 parts of water. Sodium acetate is added, to accelerate the coupling, until the solution is no longer mineral acid. Dilute caustic soda solution is then added until a slightly alkaline reaction is obtained, the sodium salt of the dyestuff is pressed off and dried. It dyes acetate artificial silk powerful red shades from an aqueous bath after the addition of sodium sulphate and acetic acid.

Example 9

A diazonium solution prepared from 138 parts of 4-nitro-1-aminobenzene is added to a solution of 135 parts of beta-N-(2.5-dimethoxyphenyl)-aminopropionic acid (obtainable by condensing acrylic acid with 2.5-dimethoxy-1-aminobenzene) in 110 parts of 36 per cent hydrochloric acid and 2000 parts of water. When coupling is completed, the dyestuff is dissolved in dilute caustic soda solution, the sodium salt of the dyestuff is separated with sodium chloride, pressed off and dried. It dyes acetate artificial silk powerful blue-red shades.

Example 10

A diazonium solution prepared from 137 parts of 4-aminobenzene-1-carboxylic acid is coupled with a solution of 188 parts of beta-N-methyl-N-phenyl-aminopropionic acid (see Example 5) in 110 parts of 36 per cent hydrochloric acid and 1500 parts of water with the addition of such an amount of sodium acetate that the solution is no longer mineral acid. When coupling is completed, the dyestuff is dissolved in dilute caustic soda solution, the sodium salt of the dyestuff is salted out with sodium chloride, pressed off and dried. It dissolves readily in water and dyes acetate artificial silk powerful orange shades from an aqueous bath after the addition of sodium sulphate and acetic acid.

Example 11

A solution of the diazonium compound of 208 parts of 6-cyano-2.4-dinitraniline in concentrated sulphuric acid is added undiluted to a solution of 267 parts of beta-N-hydroxy-ethoxyethyl-N-(3-methylphenyl)-aminopropionic acid (obtainable by adding two molecular proportions of ethylene oxide to N-(3-methylphenyl)-aminopropionic acid) in 110 parts of 36 per cent hydrochloric acid and 2000 parts of water to which 1500 parts of ice have been added. The coupling is immediately completed. The resulting dyestuff is pressed off, washed and then dissolved in dilute caustic soda solution. The sodium salt of the dyestuff separates upon the addition of sodium chloride and is pressed off and dried at 50° C. It dyes acetate artificial silk blue shades from an aqueous bath after the addition of sodium sulphate.

Example 12

A diazonium solution prepared from 138 parts of 4-nitro-1-aminobenzene is added to a solution of 300 parts of N-beta-carboxyethyl-3.7-dihydroxy-1.2.3.4-tetrahydronaphthoquinoline having the formula:

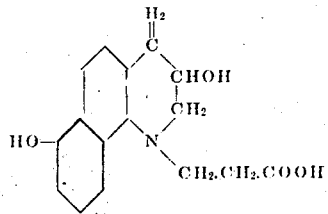

(obtainable by heating 300 parts of 3.7-dihydroxy-1.2.3.4-tetrahydronaphthoquinoline, 300 parts of alcohol, 5 parts of concentrated caustic soda solution and 280 parts of 51 per cent aqueous acrylic acid solution for 4 hours at 90° to 100° C.) in 110 parts of 36 per cent hydrochloric acid and 4000 parts of water. The coupling is completed in a few minutes. The dyestuff is dissolved by the addition of dilute caustic soda solution. The sodium salt of the dyestuff is then separated by the addition of sodium chloride, pressed off and dried. It dissolves readily in water and dyes acetate artificial silk blue shades.

Example 13

10 parts of the azo dyestuff prepared by coupling the diazo compound of 138 parts of 4-amino-1-nitrobenzene with 214 parts of beta-N-hydroxyethyl-N-(3-methylphenyl)-aminopropionic acid nitrile are heated in 100 parts of 30 per cent hydrochloric acid for about 10 hours at from 80° to 90° C. The resulting solution is diluted with 400 parts of water and the deposited dyestuff is pressed off. It is dissolved in 400 parts of water with the addition of the necessary amount of dilute caustic soda solution, salted out with sodium chloride, pressed off and dried. Acetate artificial silk is dyed brilliant red shades therewith from an aqueous bath after the addition of ammonium chloride. The same dyeing is obtained with a dyestuff prepared by coupling diazotized 4-amino-1-nitrobenzene with beta-N-hydroxyethyl-N-(3-methylphenyl)-amino-propionic acid.

In the same way the dyestuff formed by coupling diazotized 4-amino-azo-benzene with the above coupling component may be saponified. In this case also a brilliant red dyeing is obtained on acetate artificial silk.

What we claim is:

1. Azo dyestuffs, corresponding to the general formula:

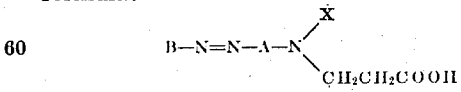

wherein B stands for a mono-nuclear radical of the benzene series, A stands for a mono-nuclear radical of the benzene series attached to the azo group shown in 4-position with reference to the amino group shown in 1-position, and wherein X stands for a lower alkyl radical, the dyestuffs being free from sulfonic acid groups.

2. Azo dyestuffs corresponding to the general formula:

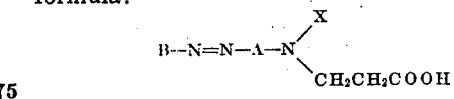

wherein B stands for a mono-nuclear radical of the benzene series containing at least one nitro group, A stands for a mono-nuclear radical of the benzene series attached to the azo group shown in 4-position with reference to the amino group shown in 1-position, and wherein X stands for a lower alkyl radical, the dyestuffs being free from sulfonic acid groups.

3. Azo dyestuffs corresponding to the general formula:

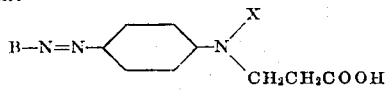

wherein B stands for a mono-nuclear radical of the benzene series containing at least one nitro group, and wherein X stands for a lower alkyl radical, the dyestuffs being free from sulfonic acid groups.

4. Azo dyestuffs corresponding to the general formula:

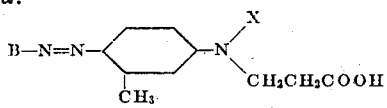

wherein B stands for a mono-nuclear radical of the benzene series containing at least one nitro group, and wherein X stands for a lower alkyl radical, the dyestuffs being free from sulfonic acid groups.

5. A process of coloring an organic derivative of cellulose which comprises applying thereto an azo dyestuff corresponding to the general formula:

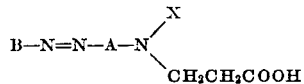

wherein B stands for a mono-nuclear radical of the benzene series, A stands for a mono-nuclear radical of the benzene series attached to the azo group shown in 4-position with reference to the amino group shown in 1-position, and wherein X stands for a lower alkyl radical, the dyestuff being free from sulfonic acid groups.

6. A process of coloring an organic derivative of cellulose which comprises applying thereto an azo dyestuff corresponding to the general formula:

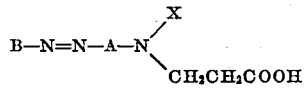

wherein B stands for a mono-nuclear radical of the benzene series containing at least one nitro group, A stands for a mono-nuclear radical of the benzene series attached to the azo group shown in 4-position with reference to the amino group shown in 1-position, and wherein X stands for a lower alkyl radical, the dyestuff being free from sulfonic acid groups.

7. A process of coloring an organic derivative of cellulose which comprises applying thereto an azo dyestuff corresponding to the general formula:

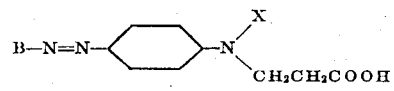

whereby B stands for a mono-nuclear radical of the benzene series containing at least one nitro group, and wherein X stands for a lower alkyl radical, the dyestuff being free from sulfonic acid groups.

8. A process of coloring an organic derivative of cellulose which comprises applying thereto an azo dyestuff corresponding to the general formula:

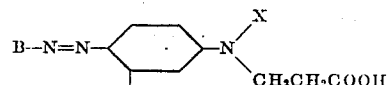

wherein B stands for a mono-nuclear radical of the benzene series containing at least one nitro group, and wherein X stands for a lower alkyl radical, the dyestuff being free from sulfonic acid groups.

9. The unsulfonated mono-aminoazo dyestuffs of the general formula

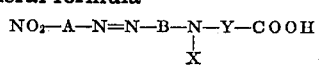

wherein A is an aromatic nucleus of the benzene series in which the nitro group stands in para-position to the —N=N— group, B is an aromatic nucleus of the benzene series in which the —N=N— group, and the

group stand in para-position to each other, X is a member selected from the group consisting of hydrogen and alkyl, and Y is a straight chain alkylene radical of two carbon atoms.

10. The azo dyestuff of the formula:

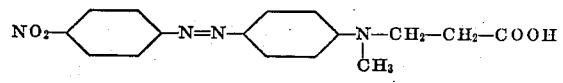

11. The azo dyestuff of the formula:

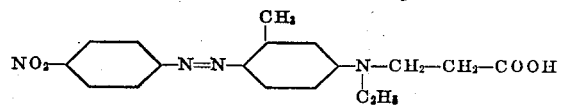

12. The azo dyestuff of the formula:

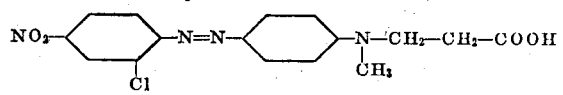

BERND V. BOCK.
HANNS UFER.
HELMUT KLEINER.